US012633518B2

(12) United States Patent
Viswanathan et al.

(10) Patent No.: US 12,633,518 B2
(45) Date of Patent: May 19, 2026

(54) FAST CHARGING AND DISCHARGING RECHARGEABLE BATTERIES BY ISOTOPE CONTROL

(71) Applicant: CARNEGIE MELLON UNIVERSITY, Pittsburgh, PA (US)

(72) Inventors: Venkatasubramanian Viswanathan, Pittsburgh, PA (US); Zeeshan Ahmad, Pittsburgh, PA (US); Shang Zhu, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 436 days.

(21) Appl. No.: 17/927,455

(22) PCT Filed: Jul. 16, 2021

(86) PCT No.: PCT/US2021/042089
§ 371 (c)(1),
(2) Date: Nov. 23, 2022

(87) PCT Pub. No.: WO2022/020215
PCT Pub. Date: Jan. 27, 2022

(65) Prior Publication Data
US 2023/0178710 A1      Jun. 8, 2023

Related U.S. Application Data

(60) Provisional application No. 63/054,090, filed on Jul. 20, 2020.

(51) Int. Cl.
H01M 4/134 (2010.01)
H01M 4/02 (2006.01)
(Continued)

(52) U.S. Cl.
CPC ......... H01M 4/134 (2013.01); H01M 4/0447 (2013.01); H01M 4/661 (2013.01);
(Continued)

(58) Field of Classification Search
CPC .. H01M 50/497; H01M 4/134; H01M 4/0447; H01M 4/661
See application file for complete search history.

(56) References Cited

U.S. PATENT DOCUMENTS

2014/0329146 A1      11/2014  Niina
2021/0184247 A1*      6/2021  Nemanick ......... H01M 10/0566

FOREIGN PATENT DOCUMENTS

JP           2017062997 A  *  3/2017  .......... H01M 10/052

OTHER PUBLICATIONS

International Search Report and Written Opinion for the International Application No. PCT/US21/42089, mailed Dec. 29, 2021, 28 pages.

(Continued)

*Primary Examiner* — Karie O'neill Apicella
(74) *Attorney, Agent, or Firm* — KDW FIRM PLLC

(57)          ABSTRACT

The present disclosure is directed to a battery having at least one electrochemical cell that comprises a cathode, an anode or an anode current collector and an electrolyte disposed between the cathode and the anode or the current collector, wherein (a) the anode comprises an isotopically enriched metal; (b) the cathode comprises isotopically enriched metal ions; (c) the electrolyte comprises an isotopically enriched metal salt; (d) a combination of (a) and (b); (e) a combination of (a) and (c); (f) a combination of (b) and (c); or (g) a combination of (a), (b) and (c).

20 Claims, 4 Drawing Sheets

ISOTOPE ENRICHED      NATURAL ABUNDANT

(51) Int. Cl.
    *H01M 4/04*        (2006.01)
    *H01M 4/66*        (2006.01)
    *H01M 50/497*     (2021.01)

(52) U.S. Cl.
    CPC .... *H01M 50/497* (2021.01); *H01M 2004/027*
            (2013.01); *H01M 2004/028* (2013.01)

(56)             References Cited

OTHER PUBLICATIONS

International Preliminary Report on Patentability for the International Application No. PCT/US2021/042089, mailed Feb. 2, 2023, 7 pages.

* cited by examiner

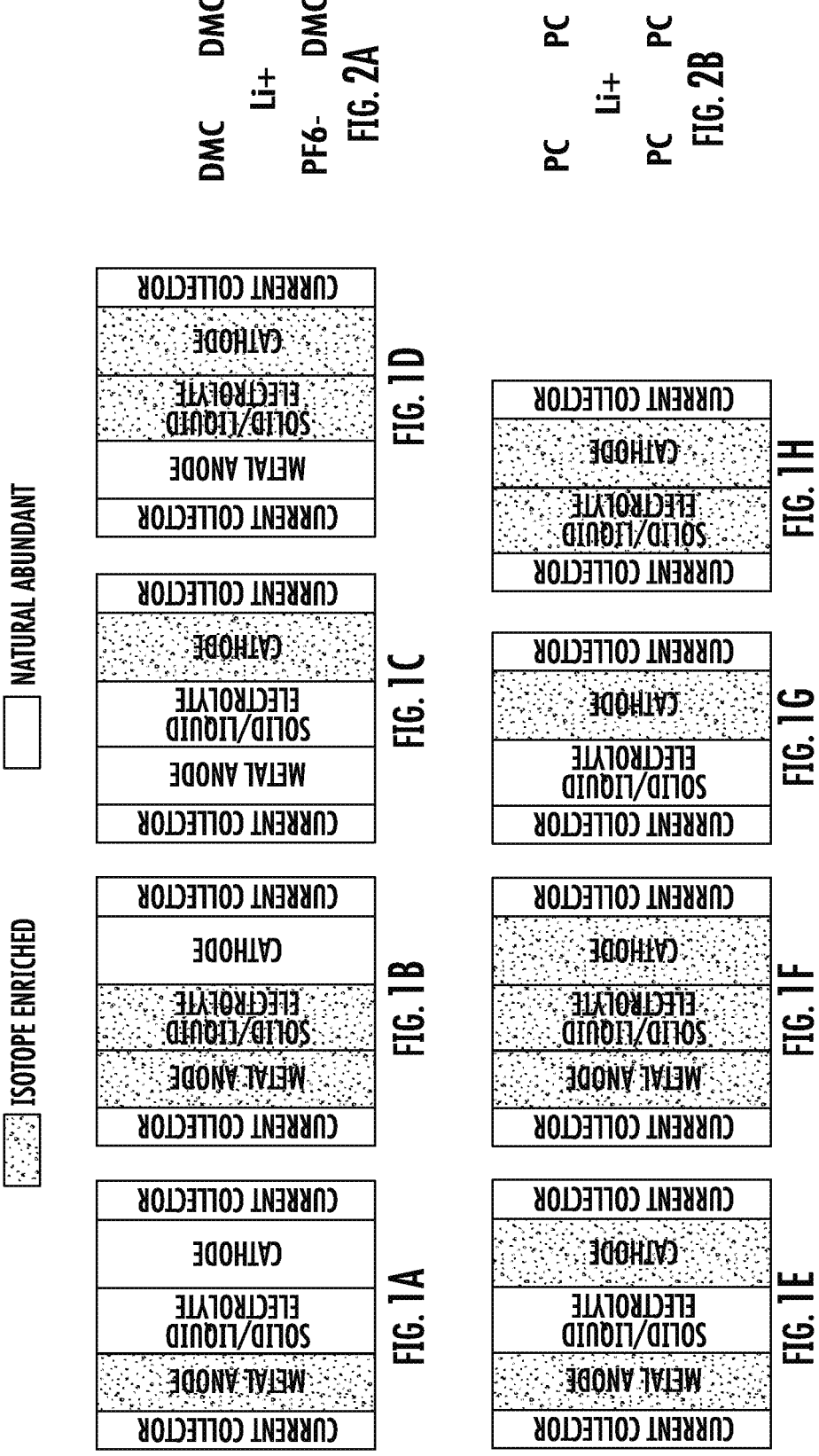

DMC    DMC

Li+

DMC
PF6-

NATURAL ABUNDANT

ISOTOPE ENRICHED

CURRENT COLLECTOR
CATHODE
ELECTROLYTE SOLID/LIQUID
METAL ANODE
CURRENT COLLECTOR

FIG. 1D

CURRENT COLLECTOR
CATHODE
ELECTROLYTE SOLID/LIQUID
CURRENT COLLECTOR

FIG. 1H

CURRENT COLLECTOR
CATHODE
ELECTROLYTE SOLID/LIQUID
METAL ANODE
CURRENT COLLECTOR

FIG. 1C

CURRENT COLLECTOR
CATHODE
ELECTROLYTE SOLID/LIQUID
CURRENT COLLECTOR

FIG. 1G

CURRENT COLLECTOR
CATHODE
ELECTROLYTE SOLID/LIQUID
METAL ANODE
CURRENT COLLECTOR

FIG. 1B

CURRENT COLLECTOR
CATHODE
ELECTROLYTE SOLID/LIQUID
METAL ANODE
CURRENT COLLECTOR

FIG. 1F

CURRENT COLLECTOR
CATHODE
ELECTROLYTE SOLID/LIQUID
METAL ANODE
CURRENT COLLECTOR

FIG. 1A

CURRENT COLLECTOR
CATHODE
ELECTROLYTE SOLID/LIQUID
METAL ANODE
CURRENT COLLECTOR

FIG. 1E

FAST CHARGING AND DISCHARGING RECHARGEABLE BATTERIES BY ISOTOPE CONTROL

RELATED APPLICATIONS

This application is a national phase filing under 35 U.S.C. § 371 claiming the benefit of and priority to International Patent Application No. PCT/US21/42089, filed Jul. 16, 2021, entitled "FAST CHARGING AND DISCHARGING RECHARGEABLE BATTERIES BY ISOTOPE CONTROL", which claims the benefit of U.S. Provisional Patent Application No. 63/054,090, filed Jul. 20, 2020, the contents of which are incorporated herein in their entirety.

GOVERNMENT RIGHTS

This invention was made with Government support under DE-AR0000774 awarded by the Advanced Research Projects Agency Energy (ARPA-E) of the US Department of Energy (DOE) through the IONICS Program. The Government has certain rights in this invention.

BACKGROUND

The present disclosure relates generally to the field of metal-ion batteries, and in specific embodiments, to lithium-ion batteries. Lithium batteries are widely used in various industries due to their high energy density.

Lithium metal cells are central towards attaining energy density storage to enable electrification of transport and aviation. Most of the research on lithium metal cells use a lithium foil in its natural isotope abundance (92.4% Li$^7$) at the anode. Conventional lithium metal anodes, however, can lead to poor rate of discharging and charging before morphological instability and formation of dendrites.

BRIEF SUMMARY OF THE INVENTION

In various embodiments, the present disclosure pertains to batteries that comprise at least one electrochemical cell that comprises a cathode, an anode or an anode current collector, and an electrolyte disposed between the cathode and the anode or the current collector. In the batteries, (a) the anode comprises an isotopically enriched metal; (b) the cathode comprises isotopically enriched metal ions; (c) the electrolyte comprises an isotopically enriched metal salt; (d) a combination of (a) and (b); (e) a combination of (a) and (c); (f) a combination of (b) and (c); or (g) a combination of (a), (b) and (c).

In some embodiments, which can be used in conjunction with any of the above embodiments, the metal is lithium, zinc, potassium, or magnesium.

In some embodiments, which can be used in conjunction with any of the above embodiments, the cathode comprises isotopically enriched metal ion, in which case the cathode may be selected, for example, from a lithium transition-metal oxide cathode, a lithium transition-metal phosphate cathode, a sulfur based cathode, a metal fluoride cathode or an air-based cathode, among others.

In some embodiments, which can be used in conjunction with any of the above embodiments, the electrochemical cell comprises the anode and the anode comprises an isotopically enriched metal. In certain embodiments, the anode comprises an isotopically enriched lithium anode.

In some embodiments, which can be used in conjunction with any of the above embodiments, the electrochemical cell comprises the anode current collector.

In some embodiments, which can be used in conjunction with any of the above embodiments, the electrolyte comprises isotopically enriched metal ions. The electrode may be selected, for example, from a liquid electrolyte and a solid electrolyte.

In some embodiments, which can be used in conjunction with any of the above embodiments, the battery further comprises an ionically conductive separator between the cathode and the anode or current collector. The separator may comprise, for example, porous glass or porous polypropylene.

In some embodiments, which can be used in conjunction with any of the above embodiments, the electrochemical cell has a specific energy ranging from 100 Wh/kg to 1000 Wh/kg.

In other embodiments, the present disclosure pertains to methods of operating a battery according to any of the above embodiments, which method comprises charging the battery and/or discharging the battery.

In embodiments where the battery initially comprises the anode, an initial cell forming step may be either a charging step or a discharging step. In embodiments where the battery initially comprises the current collector and does not comprise an anode, an initial cell forming step is a charging step.

In some embodiments, which can be used in conjunction with any of the above embodiments, (a) the electrochemical cell is charged at a current density up to 15 mA/cm$^2$ during operation, (b) the electrochemical cell is charged at a voltage ranging from 0 V to 5 V during operation, (c) the electrochemical cell is discharged at a current density up to 25 mA/cm$^2$ during operation, (d) the electrochemical cell is discharged at a voltage ranging from 0 V to 5 V during operation, or (e) any combination of (a), (b), (c) and (d).

DESCRIPTION OF THE DRAWINGS

FIGS. 1A to 1H schematically illustrate various possible electrochemical cell architectures for use in the batteries of the present disclosure.

FIGS. 2A and 2B illustrate two the primary solvation shells for use in the present disclosure.

FIG. 3A is a top view and FIG. 3B is a front view of an initial state. FIG. 3C is a top view and FIG. 3D is a front view of a final state.

FIG. 4A is a top view and FIG. 4B is a front view of an initial state. FIG. 4C is a top view and FIG. 4D is a front view of a final state.

DEFINITIONS

Figures 3A, 3B, 3C, 3D, 4A, 4B, 4C, 4D:
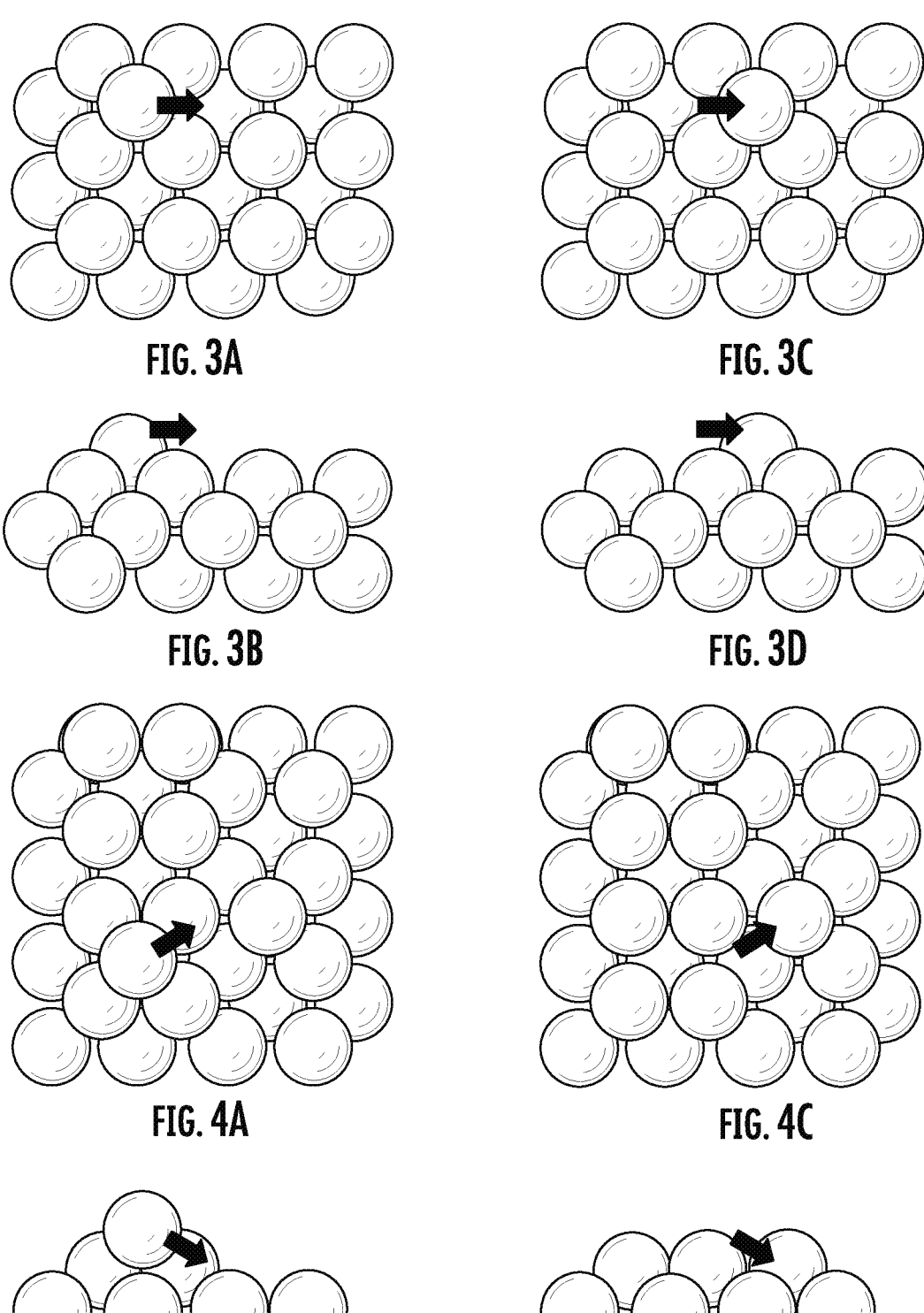
FIGS. 3A-3D schematically illustrate a terrace diffusion path of Li.
FIGS. 4A-4D schematically illustrate a direct hopping mechanism of Li.

Isotopically enriched—As used herein, this term is defined to mean that an amount of lower atomic weight isotope atoms of an element in a given material is increased relative an amount of the lower atomic weight isotope atoms of the element that occurs naturally in the material, and that the number of the lower atomic weight isotope atoms of the element in the material is more than 50% of the total number of isotope atoms of the element in the material, typically more than 90% of the total number of isotope atoms of the element in the material, and in some embodiments, 95% or more of the total number of isotope atoms of the element in the material. Taking a naturally occurring material containing the element lithium as an example, in which 7.6% of the total number of lithium isotope atoms are $^6Li$ isotope atoms and 92.4% of the total number of lithium isotope atoms are $^7Li$ isotope atoms, "isotopically enriched" means that the number of atoms of $^6Li$ isotope atoms in the material is more than 50% of the total number of lithium isotope atoms in the material. Thus, in this particular case, the relative amount of $^6Li$ isotope atoms in the material is increased by more than 42.4% relative to the corresponding naturally occurring material.

DETAILED DESCRIPTION

Described herein are batteries that comprise at least one electrochemical cell (e.g., one, two, three, four, five, six, or more electrochemical cells), which the electrochemical cell comprises a cathode, an anode or an anode current collector, and an electrolyte disposed between the cathode and the anode or the current collector. In these batteries: (a) the anode comprises an isotopically enriched metal; (b) the cathode comprises isotopically enriched metal ions; (c) the electrolyte comprises an isotopically enriched metal salt; (d) a combination of (a) and (b); (e) a combination of (a) and (c); (f) a combination of (b) and (c); or (g) a combination of (a), (b) and (c). In the present disclosure the isotopically enriched metal may be selected from lithium, zinc, potassium, and magnesium.

Various possible electrochemical cell architectures for use in the batteries of the present disclosure are shown in FIGS. 1A to 1H. In the various architectures shown, the anode can comprise an isotopically enriched metal or a naturally occurring metal, the cathode can comprise isotopically enriched metal ions or naturally occurring metal ions, and/or the electrolyte can comprise an isotopically enriched metal salt or a naturally occurring metal salt. In various beneficial embodiments pertaining to lithium-ion cells, the anode can comprise isotopically enriched lithium or naturally occurring lithium, the cathode can comprise isotopically enriched lithium ions or naturally occurring lithium ions, and/or the electrolyte can comprise an isotopically enriched lithium salt or a naturally occurring lithium salt.

FIGS. 1A-1F represent options for conventional designs, which include a metal anode, a cathode and an electrolyte. Lighter isotope enrichment is denoted by a dot-pattern filling while natural abundance is represented by a solid filling.

FIG. 1A includes an isotopically enriched anode, a naturally occurring cathode and a naturally occurring electrolyte. FIG. 1B includes an isotopically enriched anode, a naturally occurring cathode, and an isotopically enriched electrolyte. FIG. 1C includes a naturally occurring anode, an isotopically enriched cathode and a naturally occurring electrolyte. FIG. 1D includes a naturally occurring anode, an isotopically enriched cathode and an isotopically enriched electrolyte. FIG. 1E includes an isotopically enriched anode, an isotopically enriched cathode and a naturally occurring electrolyte. FIG. 1F includes an isotopically enriched anode, an isotopically enriched cathode and an isotopically enriched electrolyte.

FIGS. 1G-1H represent options for anode-free designs, which contain a current collector, but no anode at the time of cell formation. FIG. 1G includes an isotopically enriched cathode and a naturally occurring electrolyte. FIG. 1H includes an isotopically enriched cathode and an isotopically enriched electrolyte.

Examples of cathode materials for use herein include lithium transition-metal oxide cathodes such as lithium nickel cobalt manganese oxide (also known as NMC), lithium nickel cobalt aluminum oxide (also known as NCA), lithium cobalt oxide (also known as LCO), lithium nickel manganese spinel (also known as LNMO), and lithium manganese oxide (also known as LMO), lithium transition-metal phosphate cathodes such as lithium iron phosphate (also known as LFP), sulfur based cathodes such as sulfur or metal sulfides such as $Li_2S$, metal fluoride cathodes such as iron fluoride, and air-based cathodes for example, porous carbon electrodes, which may include transition metal catalysts, among others.

Examples of electrolytes for use herein include liquid electrolytes wherein a lithium salt is dissolved in a solvent. Examples of lithium salts include lithium tetrafluoroborate ($LiBF_4$) and lithium hexafluorophosphate ($LiPF_6$), lithium bisoxalato borate (LiBOB), lithium difluorooxalato borate (LiDFOB), and lithium trifluorosulfonylimide (LiTFSI). Examples of solvents include those that contain more or more alkyl carbonate such as propylene carbonate (PC), dimethyl carbonate (DMC) and dimethyl ethylene carbonate, among others.

Examples of electrolytes for use herein further include solid electrolytes, for example, sulfide-based electrolytes such as LGPS ($Li_{10}GeP_2S_{12}$), lithium phosphorus sulfide (LPS) ($Li_3PS_4$), lithium tin phosphorus sulfide (LSPS) ($Li_{10}SnP_2S_{12}$), oxide-based electrolytes such as lithium lanthanum zirconium oxide (LLZO)($Li_7La_3Zr_2O_{12}$), other garnet structure oxides, lithium lanthanum titanate (LLTO), and lithium aluminum titanium phosphate (LATP), among others.

Examples of commercially available lithium-isotopically-enriched products are summarized in the table below. $^6Li$ metal may be used as an anode material. $^6LiPF_6$ and $^6LiBF_4$ may be used as salts for electrolytes. $^6LiOH \cdot H_2O$ may be used as a precursor to form lithium cathode materials including NMC cathode materials, among others.

| Chemical Formula | Isotope Enrichment | Vendors |
| --- | --- | --- |
| $^6Li$ metal | 95 atom % | Sigma-Aldrich, Toronto Research Chemicals |
| $^6LiPF_6$ | 95 atom % | Sigma-Aldrich |
| $^6LiBF_4$ | 95 atom % | Sigma-Aldrich |
| $^6LiOH \bullet H_2O$ | 95 atom % | Sigma-Aldrich |

Examples of current collectors for use here include metals such as copper, aluminum, nickel, titanium or stainless steel, which may be crystalline or non-crystalline, and organic current collectors, such as polymers, among others. Copper current collectors include those terminated with Cu(111), Cu(110), Cu(100) surfaces, as well as non-crystalline and mixed-crystalline copper.

In various embodiments, the electrochemical cells of the present disclosure may include an ionically conductive separator which allows for ionic conductivity between the cathode and the anode or current collector, while at the same time preventing larger scale convective mixing of the electrolyte. For example, a separator made of porous glass or a porous polymer such as porous polypropylene may be included for this purpose, among others.

As previously indicated, for conventional metal-anode-based batteries, components involving isotopes include a metal anode, a cathode and a solid/liquid electrolyte. Each of these can provide metal inventory for cell operation, where the isotope control can be applied to create high energy density, metal-based batteries having increased charging and discharging capabilities. Depending on whether the initial cell forming step is done starting with discharge or charge, the isotope controlled component will change as follows. If the cell is discharged first, at least the metal anode should be enriched with the lighter isotope, since it will provide most of the functioning metal ions during cycling. If the cell is charged first, at least the cathode should be enriched with the lighter isotope. Pre-intercalated metal ions in the cathode will be deposited on the anode, whether the anode is newly formed during charging or provided with an initial metal inventory. Metal inventory in the electrolyte plays a small role in the total amount of metal involved in charging and discharging, so there is not a particularly strong incentive to replace naturally abundant isotopes in electrolytes with their lighter counterparts, although this is clearly desirable. For maximum cycling performances of metal-based batteries, all the three of the cathode, anode and electrolyte are enriched with the lighter isotope, so that the diffusion and transport phenomena are all driven by lighter isotopes, even after the initial metal inventory is consumed, for example, via side reactions and non-ideal coulombic efficiency. For anode-free metal-based batteries, the metal anode is removed from the architecture, and therefore the cell will always be charged first. Since the cell is charged first, at least the cathode should be enriched with the lighter isotope.

Configurations, which are mapped to the architectures of FIGS. 1A-1H are shown in the following table, where 'Enriched' represents isotopically enriched compositions, while 'Nat.' represents naturally abundant isotope compositions.

| Design | Anode | Cathode | Electrolyte | Figure |
|---|---|---|---|---|
| Conventional, discharging first | Enriched | Nat. | Nat. | FIG. 1A |
| Conventional, discharging first | Enriched | Nat. | Enriched | FIG. 1B |
| Conventional, charging first | Nat. | Enriched | Nat. | FIG. 1C |
| Conventional, charging first | Nat. | Enriched | Enriched | FIG. 1D |
| Conventional, discharging or charging first | Enriched | Enriched | Nat. | FIG. 1E |
| Conventional, discharging or charging first | Enriched | Enriched | Enriched | FIG. 1F |
| Anode-free, charging first | — | Enriched | Nat. | FIG. 1G |
| Anode-free, charging first | — | Enriched | Enriched | FIG. 1H |

Potential benefits of using isotopically enriched metal and/or isotopically enriched metal ions in a given electrochemical cell include improved nucleation, diffusion and transport, which can lead to more even deposition, resulting in improved cycle life, particularly at higher charging and discharging currents.

As previously indicated, in some embodiments, an isotopically enriched lithium salt (i.e., $Li^6$ dominant) is used in the electrolyte and/or isotopically enriched lithium ions (i.e., $Li^6$ dominant) is used in the cathode of a lithium-ion battery. This can lead to cells having higher specific energies, lower nucleation overpotentials, better rate capability and better control over dendrite formation at interfaces.

In embodiments where isotopically enriched lithium is used in the anode of a lithium-ion battery, functioning cells with having higher specific energies can be enabled than those in which non-isotopically enriched lithium is used, for example, having specific energies greater than about 400 Wh/kg, for example, having a specific energy ranging from about 400 Wh/kg to about 1000 Wh/kg, among other values This can also lead to cells with high discharging currents (e.g., ranging from 1 $mA/cm^2$ to 10 $mA/cm^2$, among other values) and high charging currents (e.g., ranging from 0.1 $mA/cm^2$ to 10 $mA/cm^2$, among other values).

In some embodiments, the present disclosure includes the use of isotopically enriched metal anodes and cathodes such as zinc, potassium, or magnesium, leading to higher discharging and charging performance relative to naturally abundant metal electrodes. Thus, although lithium-ion cells are general described throughout the present disclosure, the present disclosure is not so limited.

As demonstrated below, by using $^6Li$ enriched lithium in lithium-ion cells, equilibrium and kinetic isotope effects are leveraged to enhance the rate of Li diffusion on the metal anode of an a lithium-ion electrochemical cell, which can allow the use of fast charge/discharge rates.

It is shown that the rates of diffusion can be enhanced by ~10% by using $^6Li$. Further, by using $^6Li$, rate enhancement is higher for the across-step Li diffusion compared to terrace diffusion at the anode surface which can greatly reduce the propensity for dendrite growth. When dendrite initiation results in an uneven Li surface, $^6Li$ atoms from the higher surface can quickly hop to the lower surface leading to suppression of dendrite growth.

Equilibrium and Kinetic Considerations

Two different isotope effects in metal-based Li-ion batteries are assessed below: the equilibrium isotope fractionation that arises from a difference in the partition functions of the isotopologues and the kinetic isotope effect that arises due to different rates of reaction with different isotopologues. The term "isotopologue" is used for a molecule or crystalline/amorphous solid containing the isotope.

Most elements have multiple stable isotopes in nature. Any natural sample of a compound containing the element will have a mixture of its different stable isotopes. Li has two stable isotopes: $^7Li$ with a mole fraction of 92.4% and $^6Li$ with a mole fraction of 7.59%. The presence of stable isotopes in natural samples requires a proper treatment using isotope fractionation theory. The equilibrium isotope effect mandates the ratios of stable isotopes that are present in the sample at thermodynamic equilibrium. Previous work has been published by others based on thermodynamic isotope effect wherein electrodeposition has been used to perform isotope enrichment (Black, Jay R., et al. 2009. "Electrochemical Isotope Effect and Lithium Isotope Separation." *J. Am. Chem. Soc.* 131 (29). American Chemical Society (ACS): 9904-5; Acosta, Lautaro N., and Victoria Flexer. 2018. "A First Assessment on the Scale-up Possibilities of Different Electrochemical Techniques for Lithium Isotopic Enrichment." *Ind. Eng. Chem. Res.* 57 (33). American Chemical Society (ACS): 11399-11413). As shown below, Li metal has lower isotope fractionation leading to selective electrodeposition of $^6Li$ to decrease the ratio $^7Li/^6Li$ in the metal compared to the electrolyte/SEI (solid electrolyte interface).

The kinetic isotope effect is used below to assess the difference in kinetics of Li diffusion on Li surfaces. The enhancement in the across-step diffusion rate is found to be higher than the terrace diffusion which can result in low Ehrlich-Schwoebel barrier. Further, the same trend is shown below in the lithium diffusion process on Cu surfaces. Surface diffusion affects Li dendrite growth and differences in propensity to form dendrites in lower $^6Li/^7Li$ ratio metal anodes.

Equilibrium Isotope Fractionation

The isotope fractionation factor associated with isotopes of an element X, namely (lighter isotope) and (heavier isotope), is generally given between two isotopologues, $X_qA$ and $X_pB$ as the following Equation (1) (Schauble, Edwin A. 2004. "Applying Stable Isotope Fractionation Theory to New Systems." *Rev. Mineral. Geochem.* 55 (1). Mineralogical Society of America: 65-111):

$$\alpha_{X_qA-X_pB} = \frac{\left[X^H/X^L\right]_{X_qA}}{\left[X^H/X^L\right]_{X_pB}}$$

Fractionation is, hence, the ratio of the ratio of heavy to light isotope in the two materials. The values of fractionation differ from 1 only by a very small amount $\approx 10^{-3}\text{-}10^{-4}$, therefore, the values of 1000 log($\alpha$) are generally tabulated for different pairs of materials with the unit ‰. It is convenient to use a non-interacting gas of atoms of X as a reference and write the isotope fractionation between two materials as the following Equation (2):

$$\alpha_{XA-XB} = \frac{\alpha_{XA-X}}{\alpha_{XB-X}} = \frac{\beta_{XA}}{\beta_{XB}}$$

where $\beta_{XA}$ is the fractionation with respect to the non-interacting gas of atoms of X. The $\beta$ factor is usually very close to 1, hence it is represented as 1000 log($\beta$) as ‰. The isotope fractionation factor between two materials $X_pB$ and $X_qA$ can be related to equilibrium constant of the following isotope exchange reaction (Schauble 2004; Bigeleisen, Jacob, and Maria Goeppert Mayer. 1947. "Calculation of Equilibrium Constants for Isotopic Exchange Reactions." *J. Chem. Phys.* 15 (5). AIP Publishing: 261-67) as $$pX_q^LA + qX_p^HB \rightleftharpoons pX_q^HA + qX_p^LB$$

$$\alpha_{XA-XB} = \left[\frac{S_{X_q^HA}}{S_{X_q^LA}}\right]^{1/p}\left[\frac{S_{X_p^LB}}{S_{X_p^HB}}\right]^{1/pq}(K_{eq})^{1/pq}$$

where S's are the symmetry factors for the reactant and product molecules. For a reaction involving symmetry factor of 1, this expression reduces to $\alpha_{XA-XB} = (K_{eq})^{1/pq}$.

The equilibrium constant is related to the Gibbs free energy by the relation:

$$\Delta G = -RT \log(K_{eq})$$

For most reactions involving isotope fractionation, the PV work in G=F+PV is negligible and the difference of free energy F can be written as: $\Delta F = -RT \log(K_{eg})$. The free energy can be also be written in terms of the canonical partition function Q as: $F = -RT \log(Q)$. Therefore, it follows that $K_{eq}$ can be written as (Bigeleisen and Mayer 1947, supra):

$$K_{eq} = \frac{\prod Q(\text{products})}{\prod Q(\text{reactants})}$$

Since the calculation of isotope fractionation between reactions is reduced to the problem of calculating fractionations between reacting solids and a gas containing dissociated atoms ($\beta_{X_pA}$), i.e., $$X_p^LA + pX^H(\text{gas}) \rightleftharpoons X_p^HA + pX^L(\text{gas})$$

Here $X_pA$ is a crystalline containing p atoms of X in the unit cell. The equilibrium constant for this reaction is:

$$K_{eq} = \alpha_{X_pA-X}^p = \frac{Q(X_p^HA)Q(X^L)^p}{Q(X_p^LA)Q(X^H)^p}$$

giving $\beta_{X_pA}$ as:

$$\beta_{X_pA} = \alpha_{X_pA-X} = \left(\frac{Q(X_p^HA)}{Q(X_p^LA)}\right)^{1/p}\left(\frac{m^L}{m^H}\right)^{3/2}$$

Hence, the calculation of isotope fractionation involves calculation of the partition functions $Q = Q_{trans}Q_{rot}Q_{vib}$ where the subscripts stand for the translational, rotational and vibrational part of the partition function. The standard first-principles density functional theory approach involves the use of the Born-Oppenheimer approximation in which the motion of the nuclei and the electrons is treated separately. The isotope effect arises from difference in the energies associated with the motion of nuclei. For solids, $Q_{vib}$ is the only part contributing to the difference in partition function of the isotopologues. $Q_{vib}$ for solids can be computed using the harmonic oscillator model for vibrations in terms of the frequencies $v_{q,i}$ (Méheut, Merlin, et al., 2007. "Equilibrium Isotopic Fractionation in the Kaolinite, Quartz, Water System: Prediction from First-Principles Density-Functional Theory." *Geochim. Cosmochim. Acta* 71 (13). Elsevier BV: 3170-81):

$$Q_{vib} = \left[\prod_{i=1}^{3N_{at}}\prod_q \frac{\exp(-hv_{q,i}/2kT)}{1-\exp(-hv_{q,i}/kT)}\right]^{1/N_q}$$

where $N_{at}$ is the # of atoms in the crystal and $N_q$ is the number of q vectors used to sample the Brillouin zone. The frequencies corresponding to the three translations must be ignored.

Phonon frequencies for materials of interest were obtained using first-principles density functional theory perturbation theory (Baroni, Stefano, et al. 2001. "Phonons and Related Crystal Properties from Density-Functional Perturbation Theory." *Rev. Mod. Phys.* 73 (2). American Physical Society (APS): 515-62.), specifically the ph.x executable within Quantum Espresso package (Giannozzi, P, et al.

2017. "Advanced Capabilities for Materials Modelling with Quantum ESPRESSO." *J. Phys.: Condens. Matter* 29 (46). IOP Publishing: 465901; Giannozzi, Paolo, et al., 2009. "QUANTUM ESPRESSO: A Modular and Open-Source Software Project for Quantum Simulations of Materials." *J. Phys.: Condens. Matter* 21 (39). IOP Publishing: 395502.). The generalized-gradient approximation of Perdew Burke and Ernzerhof (PBE) (Perdew, John P., et al. 1996. "Generalized Gradient Approximation Made Simple." *Phys. Rev. Lett.* 77 (18). American Physical Society: 3865-8) was used as the exchange correlation functional. The phonon frequencies were computed on a given grid of q vectors. Fourier interpolation was used to determine the frequencies on a dense mesh of q vectors. The convergence of the result to the density of the mesh was ensured.

The aforementioned framework is sufficient to calculate the isotope fractionations and $\beta$ factors for solids encountered in Li-ion batteries. Several authors have studied equilibrium isotope fractionation in Li ion batteries (Hall, John C., et al. 1969. "Thermodynamics of Lithium Isotope Exchange Reactions. I. Electrochemical Investigations in Diglyme and Propylene Carbonate." *J. Chem. Phys.* 51 (3): 1145-8; Singh, Gulzar, et al. 1972. "Thermodynamics of Lithium Isotope Exchange Reactions. II. Electrochemical Investigations in Diglyme and Propylene Carbonate." *J. Chem. Phys.* 56 (5): 1855-62; Singh, Gulzar, and Peter A. Rock. 1972. "Thermodynamics of Lithium-Isotope-Exchange Reactions. III. Electrochemical Studies of Exchange Between Isotopic Metals and Aqueous Ions." *J. Chem. Phys.* 57 (12): 5556-61; Takami, Yuta, et al. "Lithium Isotope Effects Upon Electrochemical Release from Lithium Cobalt Oxide to Non-Lithium Electrolyte Solution." *Z. Naturforsch* 69 (1-2): 97-103; Okano, Koji, et al. 2015. "Lithium Isotope Effects Upon Electrochemical Release from Lithium Manganese Oxide." *Energy Procedia* 71 (May): 140-48). Isotope fractionations is assessed in three solids of interest: Li metal which is the anode in Li metal batteries, and two components of the solid-electrolyte-interface (SEI): LiF and $Li_2O$. The table below shows the fractionations of Li in these compounds. A higher $\beta$ factor denotes a higher $^7Li/^6Li$ ratio. It is found that the SEI components and LiF have higher isotope fractionation (vs Li gas) compared to Li metal. The value for Li is in agreement with the estimate of 26.4 ‰ by Black et al. (2009) supra. The value obtained for LiF is also close to the values for solvated Li from a previous theoretical study (Yamaji, Kazuyo, et al. 2001. "Theoretical Estimation of Lithium Isotopic Reduced Partition Function Ratio for Lithium Ions in Aqueous Solution." *J. Phys. Chem. A* 105 (3). American Chemical Society (ACS): 602-13.).

| Material | $\beta$ (‰) |
|---|---|
| Li | 21.37 |
| $Li_2O$ | 86.05 |
| LiF | 67.47 |

The above methodology was extended to molecules for studying fractionations in liquid electrolytes. The major modifications to the formulas are (Schauble 2004): 1) the total number of vibration modes $N_{vib}$ is $(3N_{at}-6)/(3N_{at}-5)$ for a nonlinear/linear molecule of $3N_{at}$ atoms and 2) to calculate the factor $\beta_{X_pA}$, vibrational partition function should be normalized by the product of vibration frequency instead of the masses in Equation (1). This arises due to the rotational partition function for the molecule and the application of Redlich-Teller product rule. The Equations Eq. (1) and Eq. (2) now become:

$$\beta_{X_pA} = \alpha_{X_pA-X} = \left(\frac{Q(X_p^H A)}{Q(X_p^L A)}\right)^{1/p}\left(\frac{\prod_{i=1}^{N_{vib}} u_i^H}{\prod_{i=1}^{N_{vib}} u_i^L}\right)$$

$$Q_{vib} = \prod_{i=1}^{N_{vib}} \frac{\exp(-u_i/2)}{1-\exp(-u_i)}$$

Two liquid electrolyte solvents are chosen based on current popularity and relevance to Li-ion batteries: propylene carbonate (PC) and dimethyl carbonate (DMC) respectively. The salt of lithium hexafluorophosphate ($LiPF_6$) is modeled explicitly in the second case. Solvation shell structures for these two systems are used based on the report by Kameda et al. (Kameda, Yasuo, et al. 2016. "Local structure of Li+ in concentrated LiPF6-dimethyl carbonate solutions." *Journal of Molecular Liquids* 217. Elsevier B. V.: 17-22; Kameda, Yasuo, et al. 2007. "Solvation structure of Li+ in concentrated $LiPF_6$-propylene carbonate solutions." *Journal of Physical Chemistry B* 111 (22): 6104-9) obtained using Neutron diffraction measurements. Using the experimental information about the structures, the primary solvation shells is built as shown in FIGS. 2A and 2B and ionic relaxation is done using first-principles simulations. The vibrational analysis module within the atomic simulation environment (Larsen, Ask Hjorth, et al. 2017. "The Atomic Simulation Environmental Python Library for Working with Atoms." *J. Phys.: Condens. Matter* 29 (27). IOP Publishing: 273002) is used which gives a list of normal vibration frequencies for the two molecule systems, with which the fractionations of Li can be calculated. The resulting $\beta$ factors are shown in the following table. The results are in good agreement with the previous theoretical study of Li aqueous solvation shell (Yamaji, Kazuyo, et al. 2001. "Theoretical Estimation of Lithium Isotopic Reduced Partition Function Ratio for Lithium Ions in Aqueous Solution." *J. Phys. Chem. A* 105 (3). American Chemical Society (ACS): 602-13).

| Solvation structure | $\beta$ (‰) |
|---|---|
| $[Li(PC)_4]^+$ | 48.79 |
| $[LiPF_6(DMC)_3]$ | 69.53 |

Since Li has lower fractionation than the SEI compounds and electrolytes, it is evident that Li metal anode will have a higher fraction of $^6Li$, resulting in electrodeposition with slight preference for $^6Li$. Black, Jay R., et al. 2009, "Electrochemical Isotope Effect and Lithium Isotope Separation." *J. Am. Chem. Soc.* 131 (29). American Chemical Society (ACS): 9904-5, used this effect to get large negative isotope fractionation between the Li metal and the liquid electrolyte (−37.5 ‰). One can use this to enrich the $^6Li$ isotope in the Li metal anode by starting with a liquid electrolyte rich in $^6Li$.

Kinetic Isotope Effect

The kinetic isotope effect is the difference in kinetics of reactions for molecules/crystals containing different isotopes. This effect arises due to different isotopes of the element having different reaction energy landscapes while traversing the reaction path. The different landscapes are the result of vibrational contribution to the energy of the isotopologue.

It is not straightforward to incorporate the vibrational contribution to the energy to the reaction barriers and kinetics due to tunneling and the existence of imaginary frequency at the transition state. A theory that can account for the different energy landscapes and tunneling is the semi-classical harmonic transition state theory (SC-HTST) (Bhatia, Bhawna, and David S. Sholl. 2005. "Quantitative Assessment of Hydrogen Diffusion by Activated Hopping and Quantum Tunneling in Ordered Intermetallics." *Phys. Rev. B* 72 (22). American Physical Society (APS); Fermann, Justin T., and Scott Auerbach. 2000. "Modeling Proton Mobility in Acidic Zeolite Clusters: II. Room Temperature Tunneling Effects from Semiclassical Rate Theory." *J. Chem. Phys.* 112 (15). AIP Publishing: 6787-94). At the initial state, the hopping atom has three real frequencies $v_i$, i={1,2,3} while at the transition state it has two real frequencies $v_j$, j={1,2} and one imaginary frequency $iv_+$. In this approach, one can write the temperature T dependent reaction rate as: $\kappa^{SC-HTST} = \kappa^{HTST}(T)\Gamma(T)$ where $\kappa^{HTST} = v^{HTST}(T)\exp(-E_a/\kappa_B T)$ is the rate from harmonic transition state theory and $\Gamma(T)$ is the tunneling correction. $E_a$ is the activation energy given as the difference of energies between the transition state and the initial state. The harmonic transition state frequency $v^{HTST}$ is given by Equation (3):

$$v^{HTST}(T) = \frac{\prod_{i=1}^{3} v_i f(hv_i/2k_B T)}{\prod_{j=1}^{2} v_j f(hv_j/2k_B T)}$$

where $f(x)=\sinh(x)/x$ and h is the Planck's constant. The frequency accounts for zero point vibration of the hopping atom. The tunneling correction is defined in terms of the parameter $\theta_0 = \pi E_{ZP}/hv_\pm$ as Equation (4):

$$\Gamma(T) = \frac{\exp(E_{ZP}/kT)}{1+\exp(2\theta_0)} + \frac{1}{2}\int_{-\infty}^{\theta_0} d\theta \operatorname{sech}^2\theta \exp\left(\frac{hv_\pm\theta}{\pi kT}\right)$$

where $E_{ZP} = E_a - \frac{1}{2}\Sigma_i hv_i + \frac{1}{2}\Sigma_j hv_j$. This version of SC-HTST theory neglects the coupling of the hopping atom to the rest of the lattice since only vibrational frequencies of the hopping atom are considered. Using the HTST rate and the correction given by Equation (4), the hopping rate for different isotopes is obtained.

A more accurate and general form for SC-HTST is based on the full partition functions at the initial and transition states, denoted as $Q_i$ and $Q_{TS}$ respectively, rather than just the degrees of freedom of the hopping atom (Fermann and Auerbach 2000, supra):

$$k^{SC-HTST} = \frac{kT}{h} \frac{Q_{TS}}{Q_i} \Gamma(T)$$

The partition functions can be obtained from the potential energy and the vibrational frequencies using the harmonic approximation. This modifies the harmonic transition state frequency from Equation (3) above to Equation (5):

$$v^{HTST}(T) = \frac{\prod_{i=1}^{3n} v_i f(hv_i/2k_B T)}{\prod_{j=1}^{3n-1} v_j f(hv_j/2k_B T)}$$

where n is the number of atoms contributing to the vibrational part of the partition functions. As one moves farther away from the hopping atom, the effect of the frequency of the atom on the rate decreases since the vibrational frequencies for the transition state and initial state become similar. In the results, the more accurate Equation (5) has been used to calculate the enhancements in diffusion rates. It is optimal to use this equation to assess the rate enhancement for the mechanisms involving motion of multiple atoms like the exchange mechanism.

Recently, theories based on kinetic barriers of metal ion diffusion on metal surfaces have proved promising for explaining the onset of dendrite formation and growth in Li and Mg (Jäckle et al. 2018, supra; Ozhabes, Yalcin, Deniz Gunceler, and T. A. Arias. 2015. "Stability and Surface Diffusion at Lithium-Electrolyte Interphases with Connections to Dendrite Suppression." *arXiv* 1504.05799). To study the isotope effect, the self-diffusion barriers for terrace and across-steps on the Li (100) surface were calculated using density functional theory calculations. Further, vacancy diffusion mechanism is currently the rate limiting factor resulting in high impedance and contact loss related failure in solid state batteries (Krauskopf, Thorben, et al. 2019. "Toward a Fundamental Understanding of the Lithium Metal Anode in Solid-State BatteriesAn Electrochemo-Mechanical Study on the Garnet-Type Solid Electrolyte Li6.25al0.25la3zr2o12." *ACS Applied Materials & Interfaces* 11 (15). American Chemical Society (ACS): 14463-77).

The terrace diffusion barrier can be calculated using a Li hopping path shown in FIGS. 3A-3D which shows the Terrace diffusion path of Li. FIG. 3A is a top view and FIG. 3B is a front view of the initial state. FIG. 3C is a top view and FIG. 3D is a front view of the final state. FIGS. 3A-3D are generated using VESTA (Momma, Koichi, and Fujio Izumi. 2011. "VESTA0.25em3 for Three-Dimensional Visualization of Crystal, Volumetric and Morphology Data." *J. Appl. Crystallogr.* 44 (6). International Union of Crystallography (IUCr): 1272-6.). This enables a nucleated Li to move on the surface.

Another important diffusion process that can prevent dendrite growth is the transfer of atoms from a higher to a lower surface. This transfer of atoms can reduce the surface roughness and help in preserving an even surface. This is called across-step diffusion barrier and there are two mechanisms by which it can occur. The first is the direct hopping mechanism in which the atom on the higher surface directly moves to a lower surface on its own as shown in FIGS. 4A-4D, which show the across-step diffusion path of Li (direct hopping mechanism). FIG. 4A is a top view and FIG. 4B is a front view of the initial state. FIG. 4C is a top view and FIG. 4D is front view of the final state. The Li descends from higher surface to the lower surface, reducing the surface roughness. FIGS. 4A-4D generated using VESTA (Momma and Izumi 2011, supra). The other mechanism which generally results in lower diffusion barriers is the exchange mechanism in which the atom on the higher surface replaces an atom immediately below, which then moves adjacent to its previous site.

The nudged elastic band (NEB) method (Jonsson, H., G. Mills, and K. W. Jacobsen. 1998. *Classical and Quantum Dynamics in Condensed Phase Simulations: Proceedings of the International School of Physics.* Edited by Bruce J Berne, Giovanni Ciccotti, and David F Coker. World Scientific) was employed as implemented in the atomic simulation environment (Larsen et al. 2017, supra) to calculate the diffusion barriers for Li for terrace and across-step paths. A Li (100) slab with 4 layers was used, with the bottom two layers fixed.

Figure 5:
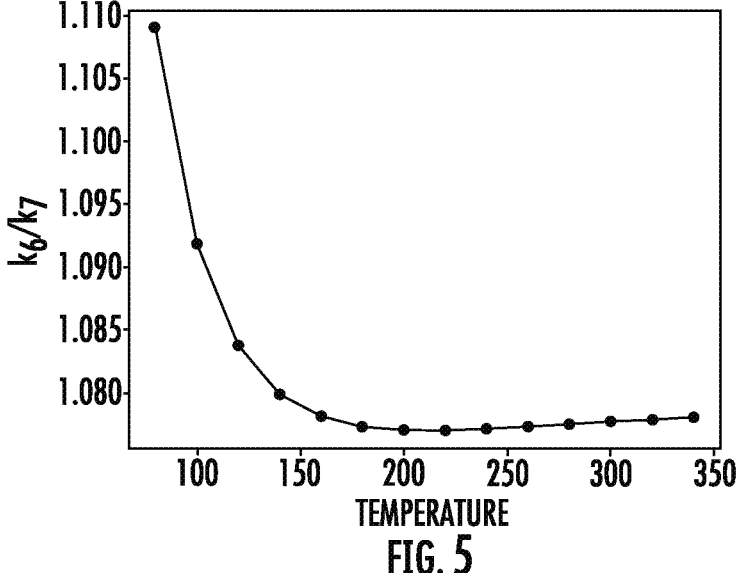
FIG. 5 shows enhancement factor versus temperature for Li terrace diffusion in accordance with the present disclosure.
Figure 6:
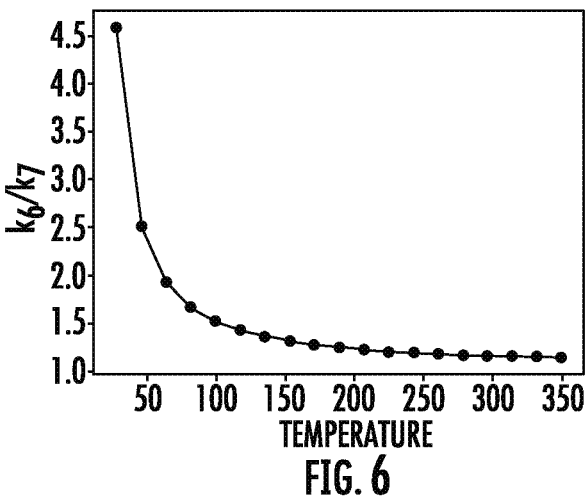
FIG. 6 shows enhancement factor versus temperature for across-step Li diffusion based on direct hopping in accordance with the present disclosure.
Figure 7:
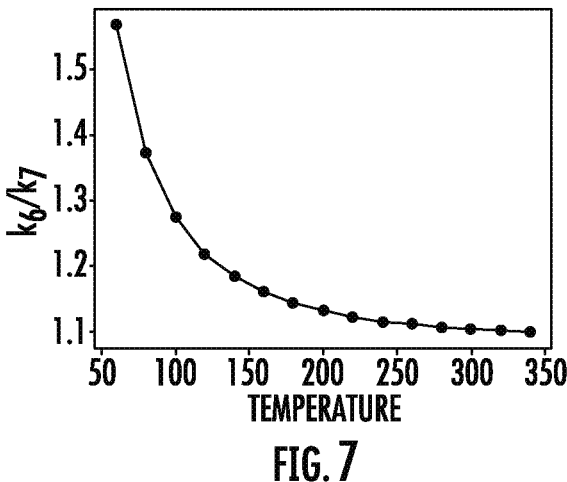
FIG. 7 shows enhancement factor versus temperature for across-step Li diffusion using the exchange mechanism in accordance with the present disclosure.

The barrier values obtained from NEB calculations at 0 K are: 0.11 eV for terrace diffusion and 0.21 eV for the across-step diffusion hopping mechanism. To obtain the rates of diffusion, the vibrational frequencies of hopping Li for the initial and the transition states were calculated. The frequencies are substituted in Equation (3) and Equation (4) to obtain the kinetic isotope effect or the ratio $k_6/k_7$ ($k_{Li^6}/k_{Li^7}$) of the rate enhancement of diffusion due to $^6$Li. FIG. 5 shows the enhancement factor for terrace diffusion, and more specifically shows variation of the kinetic isotope effect (rate ratio $k_{Li6}/k_{Li7}$) with temperature the terrace diffusion. FIGS. 6 and 7 show the rate enhancements for the across-step diffusion for the direct hopping and exchange mechanism respectively. More specifically, FIG. 6 shows variation of the kinetic isotope effect (rate ratio $k_{Li6}/k_{Li7}$) with temperature for the across-step diffusion, and FIG. 7 shows the variation of the kinetic isotope effect (rate ratio $k_{Li6}/k_{Li7}$) with temperature for the across-step diffusion using the exchange mechanism. The rate enhancements at room temperature are found to be 1.08 for terrace diffusion and 1.16 (1.1) for across-step diffusion direct mechanism (exchange mechanism). It is worth noting that the enhancement in across-step diffusion, which is essential to prevent dendrite growth, is higher than for terrace diffusion.

Figure 8:
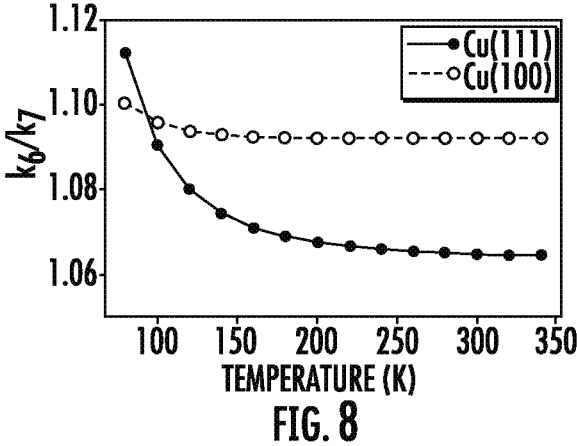
FIG. 8 shows enhancement factors versus temperature for Li terrace diffusion on Cu(111) and Cu(100) copper surfaces.

Finally, this method is extended to anode-free Li-ion batteries, where Li ion is directly plated on the current collector. Here, the Li hopping mechanism on the current collector surface plays a significant role in enabling smooth electrodeposition morphology. On copper current collector surfaces, the diffusion barriers are: 0.013 eV for surface. The hopping rate enhancements for terrace diffusion are shown in FIG. 8, which shows variation of the kinetic isotope effect (rate ratio $k_6/k_7$) with temperature for the terrace diffusion of Li on Cu(111) and Cu(100) copper surfaces where the diffusion has been improved by 10% and 6% respectively.

As can be seen from the foregoing discussion, by isotope control, one can enhance dendrite growth suppression in both metal-based batteries and anode-free batteries. This effect will be not only be applicable to lithium metal-based batteries, but it should also be valid for alternative metal-based electrodes.

Examples of implementations of the invention described herein are for purposes of illustration only and are not to be taken as limiting the scope of the invention in any way. The scope of the invention is currently set forth in the following claims.

The invention claimed is:

1. A battery comprising at least one electrochemical cell that comprises a cathode, an anode or an anode current collector and an electrolyte disposed between the cathode and the anode or the current collector, wherein:
   (a) the anode comprises an isotopically enriched metal;
   (b) the cathode comprises an isotopically enriched metal wherein a ratio of lower atomic weight metal ions to higher atomic weight metal ions is less than 90%; and
   (c) the electrolyte comprises an isotopically enriched metal salt.

2. The battery of claim 1, wherein the metal is lithium, zinc, potassium, or magnesium.

3. The battery of claim 1, wherein the cathode comprises isotopically enriched lithium ions.

4. The battery of claim 3, wherein the cathode is selected from a lithium transition-metal oxide cathode, a lithium transition-metal phosphate cathode, a sulfur based cathode, a metal fluoride cathode or an air-based cathode.

5. The battery of claim 1, wherein the anode comprises an isotopically enriched lithium anode.

6. The battery of claim 1, wherein the electrochemical cell further comprises:
   an anode current collector.

7. The battery of claim 1, wherein the electrolyte comprises isotopically enriched metal ions.

8. The battery of claim 7, wherein the electrolyte is selected from a liquid electrolyte and a solid electrolyte.

9. The battery of claim 1, further comprising:
   an ionically conductive separator between the cathode and the anode or current collector.

10. The battery of claim 9, wherein the separator comprises porous glass or porous polypropylene.

11. The battery of claim 1, wherein the electrochemical cell has a specific energy ranging from 100 Wh/kg to 1000 Wh/kg.

12. A method of operating the battery of claim 1, the method comprising:
   charging the battery and/or discharging the battery.

13. The method of claim 12, wherein the electrochemical cell is charged at a current density up to 15 mA/cm$^2$ during operation.

14. The method of claim 12, wherein the electrochemical cell is charged at a voltage ranging from 0 V to 5 V during operation.

15. The method of claim 12, wherein the electrochemical cell is discharged at a current density up to 25 mA/cm$^2$ during operation.

16. The method of claim 12, wherein the electrochemical cell is discharged at a voltage ranging from 0 V to 5 V during operation.

17. A battery comprising at least one electrochemical cell that comprises a cathode, an anode or an anode current collector and an electrolyte disposed between the cathode and the anode or the current collector, wherein:
   the anode comprises an isotopically enriched metal; and
   the cathode comprises isotopically enriched metal ions wherein a ratio of lower atomic weight metal ions to higher atomic weight metal ions is less than 90%.

18. A battery comprising at least one electrochemical cell that comprises a cathode, an anode or an anode current collector and an electrolyte disposed between the cathode and the anode or the current collector, wherein:
   the cathode comprises isotopically enriched metal ions wherein a ratio of lower atomic weight metal ions to higher atomic weight metal ions is less than 90%; and
   the electrolyte comprises an isotopically enriched metal salt.

19. The method of claim 12 wherein an initial cell forming step is charging, which causes the cathode to be enriched with the lower atomic weight metal ions.

20. The method of claim 12 wherein an initial cell forming step is discharging, which causes the metal anode to be enriched with the lower atomic weight metal ions.

* * * * *